United States Patent [19]

Nakayama et al.

[11] Patent Number: 5,151,862
[45] Date of Patent: Sep. 29, 1992

[54] VEHICULAR TRAVELING DIRECTION MEASURING SYSTEM

[75] Inventors: Okihiko Nakayama; Hiroshi Tsuda; Katsuhiko Mizushima; Toshiyuki Itoh; Hiroshi Ueno, all of Kanagawa, Japan

[73] Assignee: Nissan Motor Company, Ltd., Japan

[21] Appl. No.: 704,719

[22] Filed: May 20, 1991

Related U.S. Application Data

[63] Continuation of Ser. No. 467,834, Jan. 11, 1990, abandoned.

[30] Foreign Application Priority Data

Jan. 13, 1989 [JP] Japan ................................. 1-6620

[51] Int. Cl.⁵ .............................................. G06F 15/50
[52] U.S. Cl. ...................................... 364/454; 364/449; 364/424.01; 33/356
[58] Field of Search ............... 364/454, 449, 457, 561; 33/355 R, 356, 357; 340/988

[56] References Cited

U.S. PATENT DOCUMENTS

| | | | |
|---|---|---|---|
| 4,429,469 | 2/1984 | Tsushima et al. | 33/356 |
| 4,893,246 | 1/1990 | Iihoshi et al. | 340/988 |
| 4,924,402 | 5/1990 | Ando et al. | 364/454 |

FOREIGN PATENT DOCUMENTS

| | | |
|---|---|---|
| 3515161 | 10/1985 | Fed. Rep. of Germany . |
| 3734057 | 4/1988 | Fed. Rep. of Germany . |
| 3644683 | 7/1988 | Fed. Rep. of Germany . |
| 3736386 | 7/1988 | Fed. Rep. of Germany . |
| 3715007 | 11/1988 | Fed. Rep. of Germany . |
| 58-34483 | 2/1983 | Japan . |
| 59-100812 | 6/1984 | Japan . |
| 59-202014 | 11/1984 | Japan . |
| 62-140018 | 6/1987 | Japan . |
| 2069701 | 8/1981 | United Kingdom . |

Primary Examiner—Thomas G. Black
Attorney, Agent, or Firm—Lowe, Price, LeBlanc & Becker

[57] ABSTRACT

A system for measuring a traveling direction of a vehicle includes a geomagnetic sensor and a gyro sensor. The system utilizes first and second indices for deriving the vehicle traveling direction. The first index is indicative of a disturbance of the geomagnetic field on a short distance basis, and the second index is indicative of a disturbance of the geomagnetic field on a long distance basis. The system varies a rate of dependence upon the geomagnetic sensor and the gyro sensor based on values of the first and second indices when calculating the vehicle traveling direction.

12 Claims, 9 Drawing Sheets

VEHICULAR TRAVELING DIRECTION MEASURING SYSTEM

This application is a continuation of application Ser. No. 07/467,834 filed Jan. 11, 1990 now abandoned.

BACKGROUND OF THE INVENTION

1. Field of the Invention

This invention relates generally to a system for measuring a traveling direction of a vehicle and, more specifically, to a vehicular traveling direction measuring system which can provide an accurate measurement of a traveling direction of the vehicle by utilizing a geomagnetic sensor and a gyro sensor.

2. Description of the Background Art

One of previously proposed systems for measuring a vehicle traveling direction is exemplified by Japanese First Patent Publication No. 58-34483.

In this publication, the system utilizes a geomagnetic sensor which derives an absolute traveling direction of the vehicle based on the geomagnetism, and a gyro sensor which derives a relative variation in traveling direction of the vehicle. The system is adapted to measure the traveling direction of the vehicle by utilizing the combination of outputs from the geomagnetic sensor and the gyro sensor, as will be described hereinbelow with reference to FIG. 1.

Figure 1:
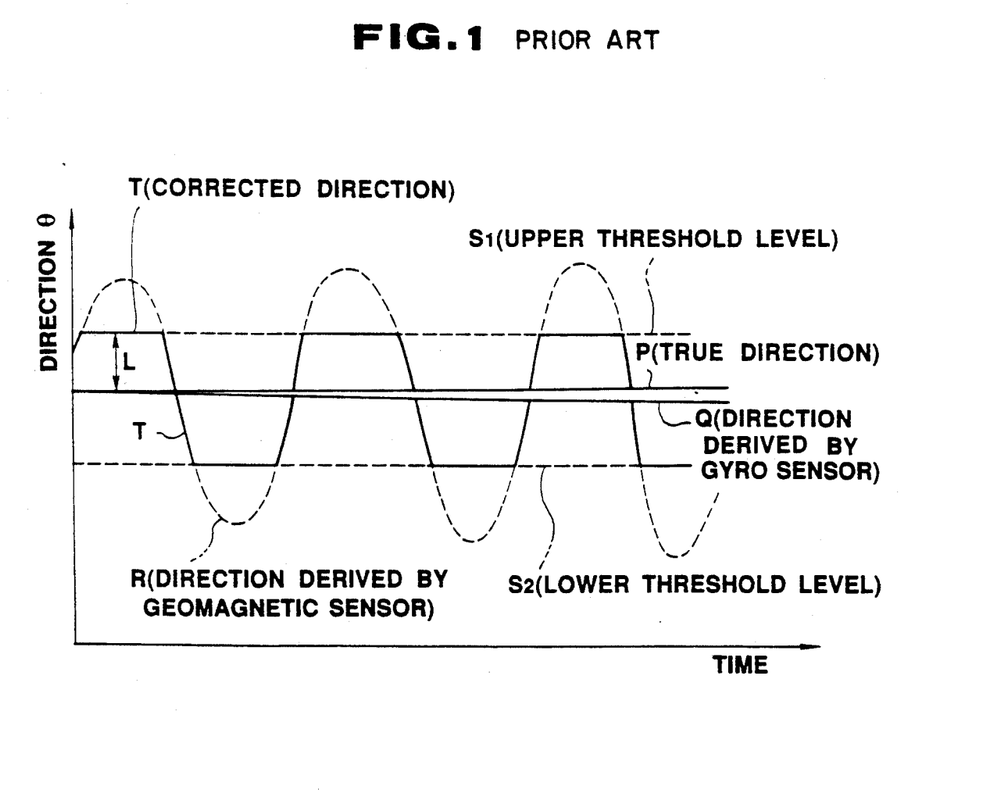
FIG. 1 is a graph of time versus direction showing the traveling direction measurement characteristics performed by the prior art.

Assuming that the vehicle is running in a direction P on a straight road where the disturbance of the geomagnetic field is occurring, a traveling direction derived by the gyro sensor becomes a straight line Q which is stable and close to the direction P because the gyro sensor is, as is known, not affected by the environmental geomagnetic condition. The deviation between the directions P and Q is caused by an error due to a drift of the gyro sensor. Since the error is accumulated with a lapse of time or increment of a distance travelled by the vehicle, the deviation between the directions P and Q gets larger as shown in FIG. 1. On the other hand, because the direction derived by the geomagnetic sensor is affected by the environmental geomagnetism, it is exemplarily described as a sine curve R in FIG. 1.

Accordingly, when the vehicle traveling direction is measured solely based on the output of the geomagnetic sensor as disclosed, for example, in Japanese First Patent Publication No. 59-100812, an error between a true vehicle traveling direction and the measured traveling direction becomes considerably large when the geomagnetic environment is bad. On the other hand, when the vehicle traveling direction is measured solely based on the gyro sensor as disclosed, for example, in Japanese First Patent Publication No. 59-202014, an error between a true vehicle traveling direction and the measured traveling direction gets larger with the lapse of time as mentioned above.

In order to overcome the above-mentioned defects, predetermined constant lower and upper threshold levels S1 and S2 are set as shown in FIG. 1, which are selected by obtaining difference between the directions R and Q measured by the geomagnetic sensor and the gyro sensor, respectively. When the direction R exceeds the threshold level S1 or S2, the direction R is corrected to be equal to the threshold level S1 or S2 so as to obtain a directional line T which is held as a finally derived traveling direction of the vehicle. Accordingly, the direction R obtained by the geomagnetic sensor is corrected by the direction Q obtained by the gyro sensor to reduce the error to a difference L between the threshold level and the true traveling direction P of the vehicle.

However, as is clear from FIG. 1, the error L is still considerably large. Therefore, when a geographical position of the vehicle is calculated using the corrected directional line T, a difference between a true position of the vehicle and a calculated position of the vehicle gets larger with the lapse of time because the error is accumlated with the lapse of time.

Further, because the gyro sensor is utilized only for setting the threshold levels to provide a stabler output of the geomagnetic sensor, an extreme advantage of the gyro sensor, that is, providing a relative directional variation with high accuracy without being affected by the environmental geomagnetism, is not effectively utilized.

SUMMARY OF THE INVENTION

Therefore, it is an object of the present invention to provide a system for measuring a traveling direction of a vehicle that can eliminate the above-noted defects inherent in the background art.

It is another object of the present invention to provide a system for measuring a traveling direction of a vehicle that can provide an accurate measurement of a traveling direction of the vehicle by changing a rate of dependence upon an output of a geomagnetic sensor and an output of a gyro sensor according to values of geomagnetic environment indices when calculating a vehicle traveling direction.

To accomplish the above-mentioned and other objects, according to one aspect of the present invention, a system for measuring a traveling direction of a vehicle, comprises first means for deriving a first vehicle traveling direction based on an output from a gyro sensor, and second means for deriving a second vehicle traveling direction based on an output from a geomagnetic sensor, the geomagnetic sensor deriving the output based on a geomagnetic field around the vehicle.

The system further includes third means for deriving a first index indicative of a disturbance of the geomagnetic field on a short distance basis, fourth means for deriving a second index indicative of a disturbance of the geomagnetic field on a long distance basis, and fifth means for caculating a third vehicle traveling direction based on the first and second directions by changing a rate of dependence upon the first and second directions based on values of the first and second indicies.

According to another aspect of the present invention, a system for measuring a traveling direction of a vehicle, comprises first means for deriving a first variation representing a change in a traveling direction of the vehicle based on an output from a gyro sensor, second means for deriving a first vehicle traveling direction based on the first variation, third means for deriving a second vehicle traveling direction based on an output from a geomagnetic sensor, the geomagnetic sensor deriving the output based on a geomagnetic field around the vehicle, and fourth means for deriving a second variation representing a change in the second vehicle traveling direction.

The system further includes fifth means for deriving a first index which is indicative of a difference between the first and second variations to represent disturbance of the geomagnetic field on a short distance basis, sixth means for deriving a second index which is indicative of a difference between the first and second vehicle traveling directions to represent a disturbance of the geomagnetic field on a long distance basis, and seventh means for calculating a third vehicle traveling direction based on the first and second directions and for changing a rate of dependence upon the first and second directions based on values of the first and second indices to derive the third vehicle traveling direction.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 2:
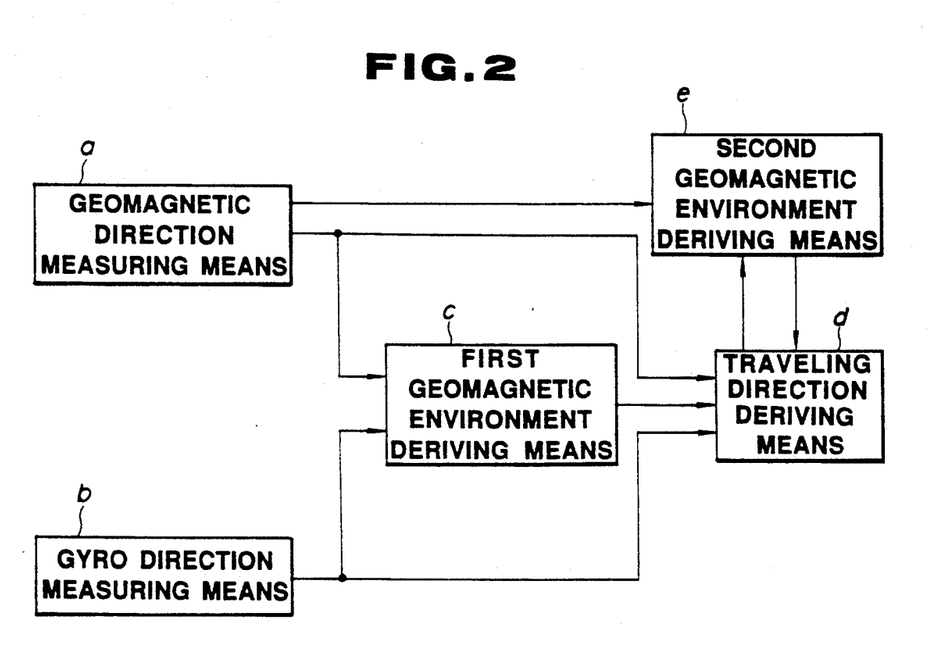
FIG. 2 is a schematic block diagram showing the general construction of a system for measuring a traveling direction of a vehicle according to the present invention.

Referring now to the drawings, particularly to FIG. 2, the general and fundamental concepts of a system for measuring a traveling direction of a vehicle, according to the present invention, are illustrated in a form of functional blocks.

As seen from FIG. 2, the system includes a geomagnetic direction measuring means (a) which provides a traveling direction of the vehicle using a geomagnetic sensor, and a gyro direction measuring means (b) which provides a traveling direction of the vehicle using a gyro sensor. The system also includes a first geomagnetic environment deriving means (c) for providing a first geomagnetic environment index $\beta$ indicative of a disturbance of the geomagnetic field per short distance, for example, of the order of several meters. Specifically, the first means (c) calculates a difference between a variation in a vehicle traveling direction measured by the geomagnetic direction measuring means (a) and a variation in a vehicle traveling direction measured by the gyro direction measuring means (b), per a predetermined unit distance travelled by the vehicle. This difference is used as the first geomagnetic environment index $\beta$.

Practically, the calculation by the first means (c) may be first performed on a basis of a predetermined unit time and then converting the calculated value to a value corresponding to a predetermined unit distance travelled by the vehicle.

The system further includes a second geomagnetic environment deriving means (e) for providing a second geomagnetic environment index $\gamma$ indicative of a disturbance of the geomagnetic field per long distance, for example, of the order of several 10 to several 100 meters. Specifically, the second means (e) calculates a difference between a traveling direction of the vehicle derived by a below-noted vehicle traveling direction deriving means (d) using the first geomagnetic environment index $\beta$ and a traveling direction of the vehicle derived by the geomagnetic direction measuring means (a), per a predetermined unit distance travelled by the vehicle. This difference is used as the second geomagnetic environment index $\gamma$.

Finally, the vehicle traveling direction deriving means (d) derives a vehicle traveling direction by calculating outputs from the geomagnetic direction measuring means (a) and the gyro direction measuring means (b), changing a rate of dependence on those outputs based on the first and second geomagnetic environment indicies $\beta$ and $\gamma$.

Assuming that the measurement of the vehicle traveling direction is performed solely by the geomagnetic sensor, normally it is possible to obtain an accurate measured direction, i.e. when the geomagnetic disturbance is not substantial, while it is impossible to obtain an accurate measured value when the geomagnetic disturbance is substantial. On the other hand, if the measurement of the vehicle traveling direction is performed solely by the gyro sensor, a measurement error caused by the drift of the gyro sensor is accumulated with the increment of the distance travelled by the vehicle. Accordingly, it is possible to obtain a reliable result for a short distance, while largely deviating from the true traveling direction of the vehicle for a long distance.

In order to effectively utilize the features of both sensors, the system according to the present invention uses the first and second geomagnetic environment indicies $\beta$ and $\gamma$ as described above. By varying the rate of dependence upon the geomagnetic sensor and the gyro sensor, not in an ON-OFF fashion but continuously, based on the values of the first and second geomagnetic environment indices $\beta$ and $\gamma$, the system is capable of providing an accurate measurement of the vehicle traveling direction without being adversely affected by the magnetic disturbance and the drift of the gyro sensor.

Now a preferred embodiment of the vehicular traveling direction measuring system according to the present invention will be described with reference to FIGS. 3 to 11.

Figure 3:
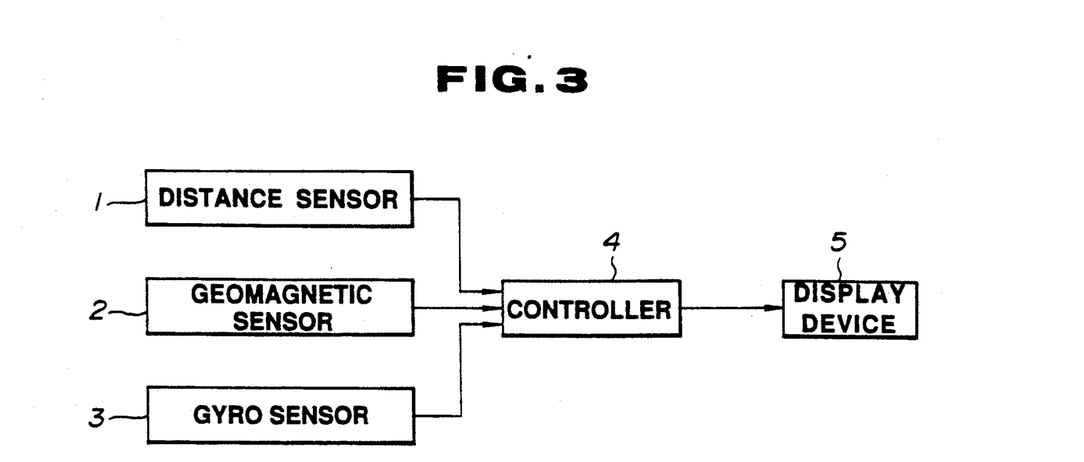
FIG. 3 is a schematic block diagram showing a preferred embodiment of the present invention.

FIG. 3 shows a block diagram of the vehicular traveling direction measuring system of the preferred embodiment. In FIG. 3, a distance sensor 1 outputs a signal indicative of a distance travelled by the vehicle to a controller 4. The distance sensor 1 may be in the form of a photoelectric, electromagnetic or mechanical-contact sensor which outputs pulse signals in proportion to the number of rotation of a tire. A geomagnetic sensor 2 outputs a signal indicative of an absolute traveling direction of the vehicle on a basis of the geomagnetism to the controller 4. A rate gyro sensor 3 outputs a signal indicative of a variation in traveling direction of the vehicle to the controller 4.

The controller 4 comprises, for example, a microcomputer and receives the outputs from the distance sensor 1, the geomagnetic sensor 2 and the rate gyro sensor 3 as described above. The controller 4 counts the pulses output from the distance sensor 1 and calculates the distance travelled by the vehicle. The controller 4 further calculates a vehicle traveling direction based on the outputs from the geomagnetic sensor 2 and the rate gyro sensor 3 to determine a position of the vehicle on a two-dimensional coordinate or an X-Y coordinate per a predetermined unit distance travelled by the vehicle.

A display device 5, such as a CRT (cathode-ray tube) display device and a liquid crystal display device, renews and displays in sequence a current position of the vehicle based on the positional data output from the controller 4.

A general operation of the vehicular traveling direction measuring system of the preferred embodiment will be described hereinbelow with reference to FIG. 4 which shows a general flowchart to be executed for obtaining the current position of the vehicle in sequence on the X-Y coordinate.

Immediately after starting execution of the process, the process goes to an initialize step 100 where an initialize routine is executed. At a step 102, a current position of the vehicle is set by a driver's keyboard-input, and then at a step 104, the current position of the vehicle and a peripheral map are displayed on the display device 5.

When an interrupt routine is allowed to enter at an allow interrupt step 105, then the process goes to a main loop comprising steps 108 to 114. In this main loop, when it is determined at a step 112 based on an output from the interrupt routine steps 108 and 110 that the current position of the vehicle has been changed, the current position of the vehicle and the peripheral map are renewed at a step 114.

Figure 4:
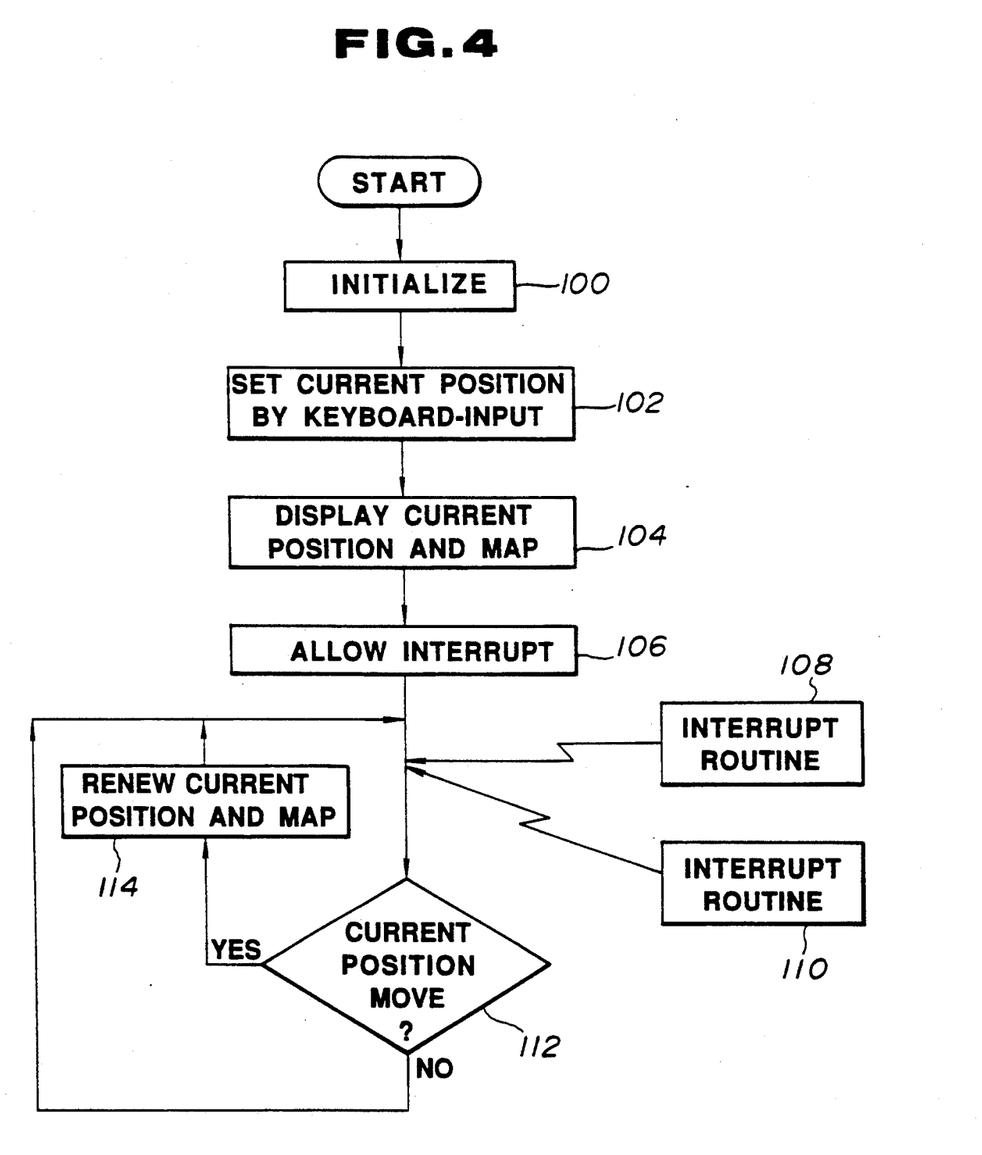
FIG. 4 is a general flowchart to be executed by a controller in the preferred embodiment of FIG. 3.
Figure 5:
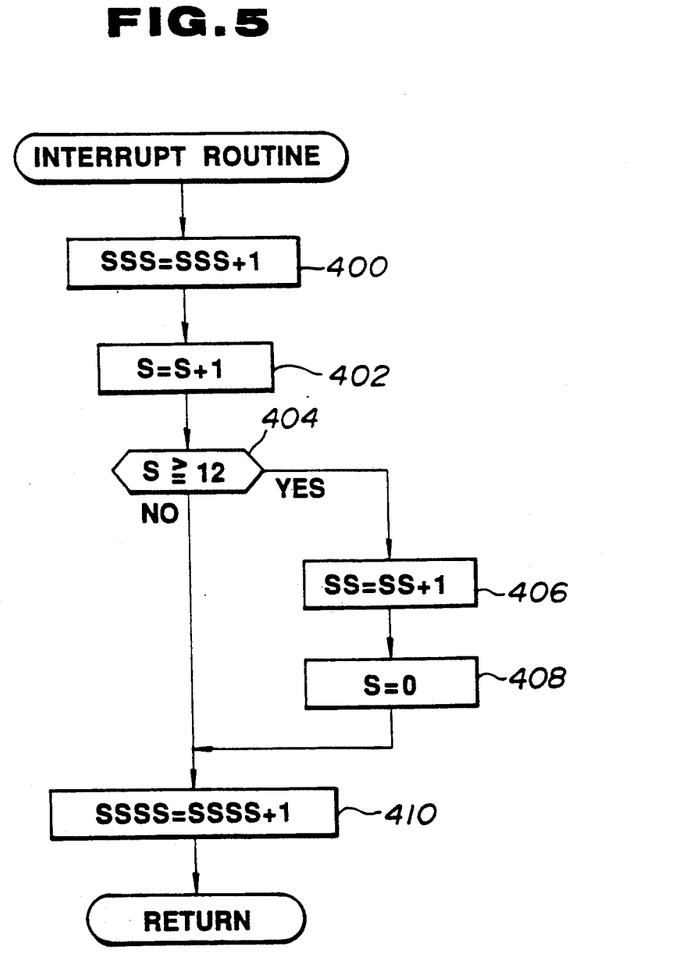
FIG. 5 is a flowchart showing an interrupt routine to be executed per a predetermined distance by the controller in the preferred embodiment of FIG. 3

FIG. 5 shows a flowchart of the interrupt routine indicated as the step 108 in FIG. 4. This interrupt routine is executed per a predetermined distance $\Delta D$ travelled by the vehicle. Specifically, if the distance sensor 1 outputs 24 pulses per one rotation of the tire, then $\Delta D$ is, for example, 6 to 7 centimeters, which however is variable according to an outer diameter of the tire, and the interrupt routine is executed 24 times per one rotation of the tire.

In FIG. 5, a counter SSS is counted up by 1 per every execution of the interrupt routine at a step 400 and is used for determining whether the vehicle is stopped. A counter S is also counted up by 1 per every execution of the interrupt routine at a step 402, and a counter SS is counted up by 1 per every 12 executions (per half rotation of the tire) of the interrupt routine as shown at steps 404 and 406. Specifically, the counter SS is counted up by 1 in response to the counter S counting up 12 times. The counter S is reset to zero at a step 408. These counters S and SS are used for calculating the vehicle traveling direction, which will be described later. A counter SSSS is counted up by 1 per every execution of the interrupt routine at step 410 and is used for calculating the current position of the vehicle, which will be also described later.

Figure 6A:
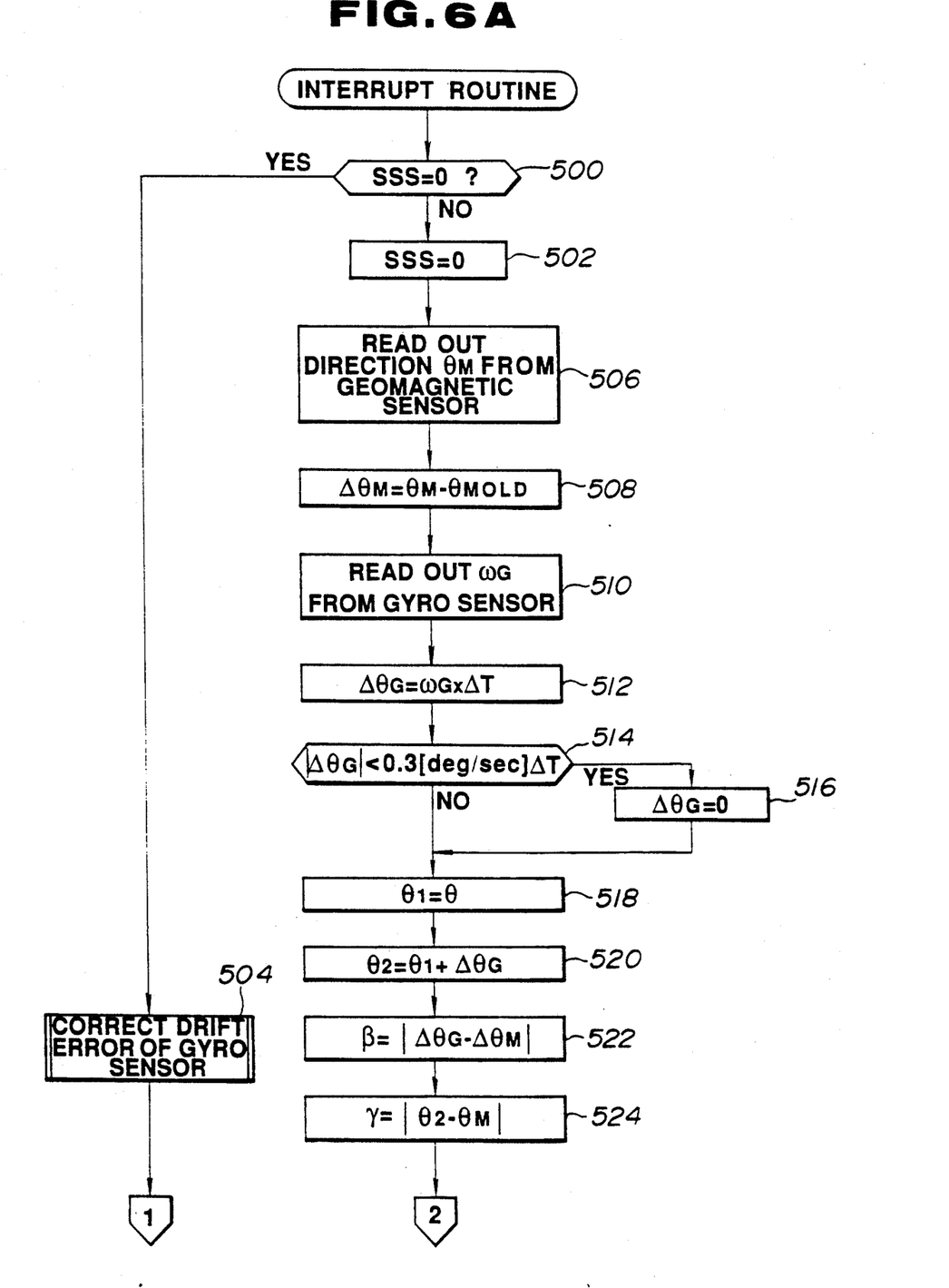
FIGS. 6A and 6B are flowcharts showing an interrupt routine to be executed per a predetermined time by the controller in the preferred embodiment of FIG. 3
Figure 6B:
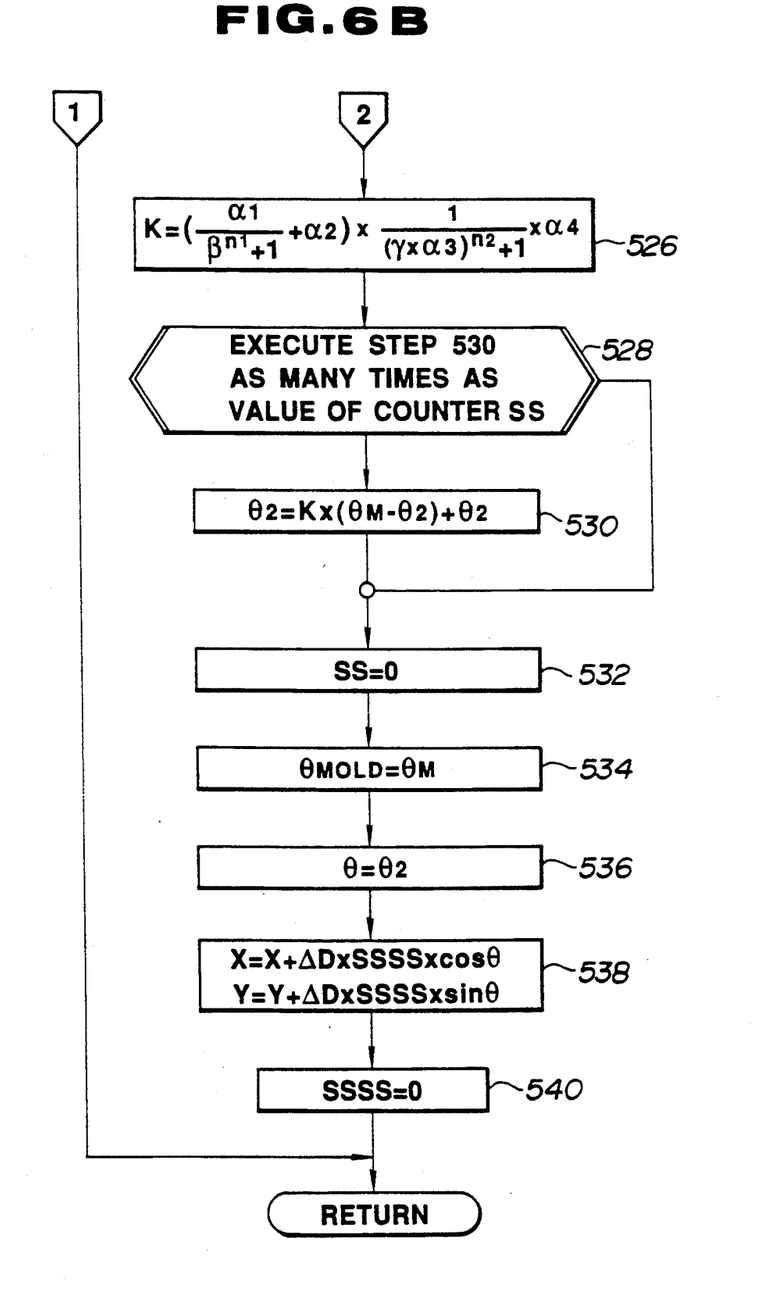

FIGS. 6A and 6B show a flowchart of the interrupt routine indicated as the step 110 in FIG. 4. This interrupt routine is executed per a predetermined unit time $\Delta T$, for example, every 100 msec.

In FIG. 6A, it is determined whether the vehicle is stopped at a step 500. When a value of the counter SSS is zero, that is, the vehicle is stopped and no variation of the traveling direction is possible, then the routine goes to a step 504 bypassing a subsequent traveling direction calculation routine. At the step 504, a correction of the gyro sensor drift is performed. Because an angular velocity of the vehicle should be zero when it is stopped, an output of the gyro sensor is considered to be a value of the gyro sensor drift.

On the other hand, when the answer at the step 500 is NO, that is, the vehicle is moving, the counter SSS is reset to zero at a step 502, and the routine goes to a step 506. At the step 506, the absolute traveling direction $\theta_M$ of the vehicle derived by the geomagnetic sensor 2 is read out, and at a step 508, a difference $\Delta\theta_M$ between the absolute direction $\theta_M$ and a prior absolute direction $\theta_{MOLD}$ is derived. The prior absolute direction $\theta_{MOLD}$ is an absolute direction $\theta_M$ which has been obtained during the prior execution of the interrupt routine and is stored at a step 534 in sequence for a subsequent execution of the interrupt routine.

At a step 510, an angular velocity $\omega_G$ in a yawing direction of the vehicle derived by the gyro sensor 3 is read out, and at a step 512, a directional variation $\Delta\theta_G$ is calculated by $\omega_G \times \Delta T$. When an absolute value of $\Delta\theta_G$ is determined less than 0.3(deg/sec)$\Delta T$ at a step 514, the routine goes to a step 516 where $\Delta\theta_G$ is set to zero. Accordingly, through the steps 514 and 516, the directional variation $\Delta\theta_G$ is disregarded during a subsequent calculation routine when the absolute value of $\Delta\theta_G$ is less than a predetermined value. Specifically, as described above, because the measuring error caused by the drift is inherent to the gyro sensor, though the drift error is small in one execution of the interrupt routine, it becomes considerably large through integration as the interrupt routine is executed repeatedly. Accordingly, the steps 514 and 516 prevent the directional variation caused by the gyro sensor drift from being integrated during the interrupt routine.

Through steps 518 to 530, a traveling direction of the vehicle is calculated based on the data obtained by the outputs of the geomagnetic and gyro sensors.

At the step 518, a traveling direction $\theta$ of the vehicle derived by the prior execution of the interrupt routine and stored at a step 536 is set to $\theta_1$. Subsequently, at the step 520, the directional variation $\Delta\theta_G$ obtained by the gyro sensor is added to the direction $\theta_1$ so as to derive a direction $\theta_2$. Accordingly, the direction $\theta_2$ only includes the directional variation derived by the gyro sensor in the current interrupt routine.

At the steps 522 and 524, the geomagnetic environment indices $\beta$ and $\gamma$ are calculated. The geomagnetic environment index $\beta$ derived at the step 522 corresponds to the output derived from the first geomagnetic environment deriving means (c) in FIG. 2, and the geomagnetic environment index $\gamma$ derived at the step 524 corresponds to the output derived from the second geomagnetic environment deriving means (e) in FIG. 2.

The geomagnetic environment index $\beta$ is calculated by an equation $$\beta = |\Delta\theta_G - \Delta\theta_M|$$

and is indicative of a difference between the outputs of the geomagnetic sensor and the gyro sensor in a short distance or in a short time, and thus is indicative of a disturbance of the geomagnetic field in a short distance or in a short time, for example, of the order of several meters.

The geomagnetic environment index $\beta$ has the following meaning.

When the vehicle is running on a high level road, a disturbance component is increased in the output of the geomagnetic sensor per several meters travelled by the vehicle. It is considered that this increment of the disturbance component is caused by the metallic structural members of the high level road. Further, when the vehicle is traveling on a road under the high level road, the disturbance component is also increased in the output of the geomagnetic sensor per several meters travelled by the vehicle due to supporting posts arranged on both sides of the road for supporting the high level road. The geomagnetic environment index $\beta$ is a numeric value for defining the above-noted disturbance component in a short distance or in a short time. Accordingly, the geomagnetic environment index $\beta$ is derived by comparing the output of the gyro sensor which is considered to be accurate for a short distance and the output of the geomagnetic sensor.

On the other hand, the magnetic environment index $\gamma$ is calculated by an equation $$\gamma = |\theta_2 - \theta_M|$$

and is indicative of a difference between the direction $\theta_2$ derived at the step 520 and the absolute direction $\theta_M$ read out at the step 506, and thus is a numeric value indicative of a disturbance of the geomagnetic field, i.e. the disturbance of the output of the geomagnetic sensor, in a distance (for example, of the order of several 10 to several 100 meters) longer than that in the case of the geomagnetic environment index $\beta$. This long distance disturbance of the geomagnetic field is likely to occur, for example, when the vehicle is running close to and in parallel with a railroad or on a road under which a subway is extended.

Figure 7:
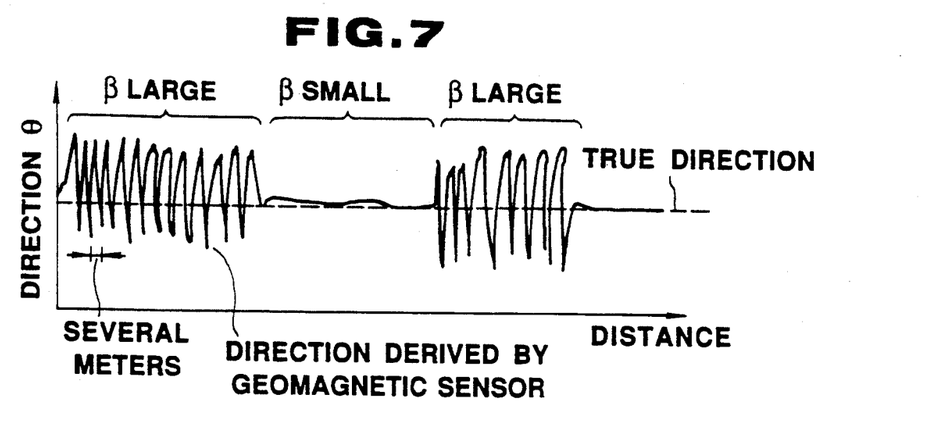
FIG. 7 is a graph of distance versus direction showing an influence of short distance disturbance of the geomagnetic field upon the measurement of the vehicle traveling direction
Figure 8A:
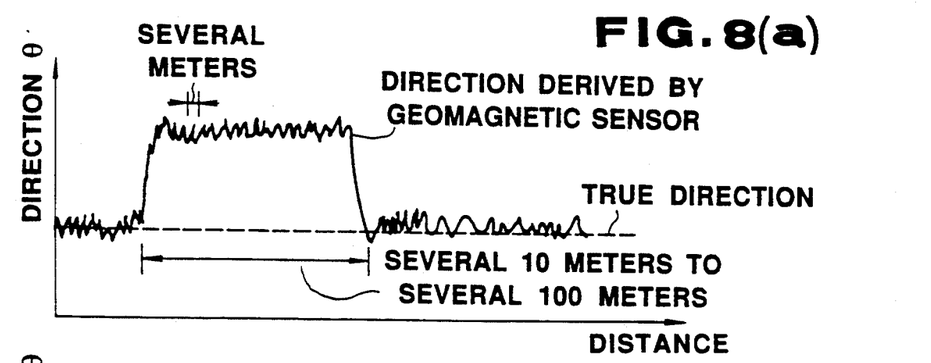
FIG. 8(a) is a graph of distance versus direction showing an influence of short and long distance disturbance of the geomagnetic field upon the measurement of the vehicle traveling direction
Figures 8B, 8C:
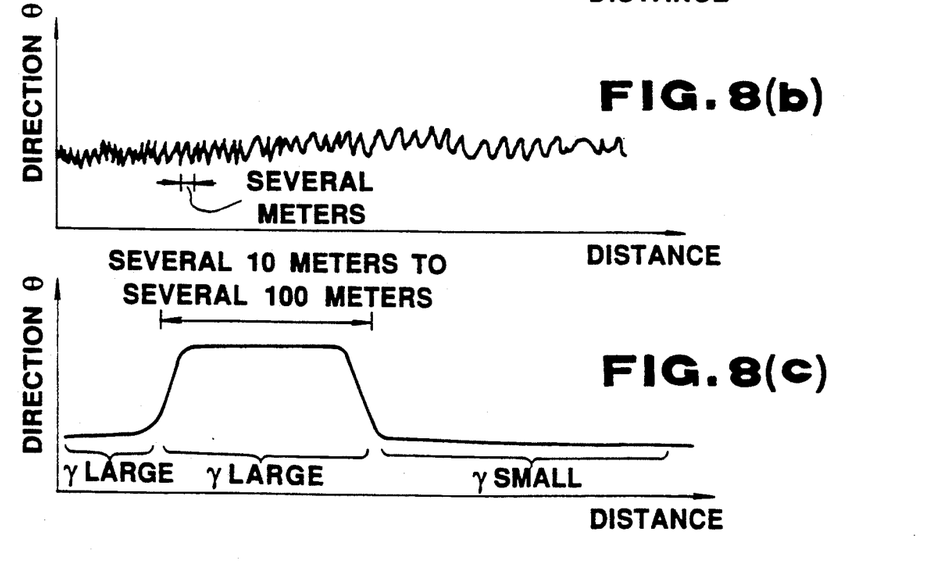
FIG. 8(b) is a graph of distance versus direction showing an influence of short distance disturbance of the geomagnetic field upon the measurement of the vehicle traveling direction
FIG. 8(c) is a graph of distance versus direction showing an influence of long distance disturbance of the geomagnetic field upon the measurement of the vehicle traveling direction

FIGS. 7 and 8 respectively show graphs of distance versus direction showing an influence of the disturbance of the geomagnetic field upon the measurement of the vehicle traveling direction.

In FIGS. 7 and 8(a), a true traveling direction of the vehicle is indicated by a dotted line, that is, the vehicle is traveling in the same direction.

FIG. 7 shows one example wherein the short distance disturbance of the geomagnetic field is large. The solid line shows the vehicle traveling direction derived by the geomagnetic sensor. The geomagnetic environment index $\beta$ varies largely in this example.

FIG. 8(a) shows another example wherein the short distance disturbance and the long distance disturbance of the geomagnetic field is included, while the short distance disturbance is quite smaller than that in FIG. 7. FIG. 8(b) shows the solid line of FIG. 8(a) extracting the short distance disturbance component only, while FIG. 8(c) shows the solid line of FIG. 8(a) extracting the long distance disturbance component only. In this example, the short distance disturbance is small, i.e. the variation of the geomagnetic environment index $\beta$ is small, while the long distance disturbance is large, i.e. the variation of the geomagnetic environment index $\gamma$ is large.

Referring back to FIG. 6B, a coefficient K is calculated at the step 526 based on the following equation (1).

$$K = \left( \frac{\alpha_1}{\beta^{n_1} + 1} + \alpha_2 \right) \times \frac{1}{(\gamma \times \alpha_3)^{n_2} + 1} \times \alpha_4 \qquad (1)$$

The coefficient K is a nemeric value for determining how fast the direction $\theta_2$ derived at the step 520 is to approach the absolute direction $\theta_M$ read out at the step 506, which will be described later.

In the equation (1), the geomagnetic environment indices $\beta$ and $\gamma$ are the values derived at the steps 522 and 524, respectively, and $\alpha_1$, $\alpha_2$, $\alpha_3$, $\alpha_4$, n1 and n2 are all constants, respectively. These constants are set, for example, to the following values.

$\alpha_1 = 0.58 \qquad n1 = 6$
$\alpha_2 = 0.02 \qquad n2 = 1$
$\alpha_3 = 2$
$\alpha_4 = 0.1$ to 1

If these values (assuming $\alpha_4 = 0.1$) are substituted for the corresponding constants in the equation (1), then $$K = \left( \frac{0.58}{\beta^6 + 1} + 0.02 \right) \times \frac{1}{2\gamma + 1} \times 0.1 \qquad (2)$$

In the equation (2), if the first term of the right side is denoted by $K_1$ and the second term of the right side is denoted by $K_2$, then $$K = K_1 \times K_2 \times 0.1 \qquad (3)$$

Accordingly, $K_1$ is determined by the geomagnetic environment index $\beta$ and $K_2$ is determined by the geomagnetic environment index $\gamma$.

Figure 9A:
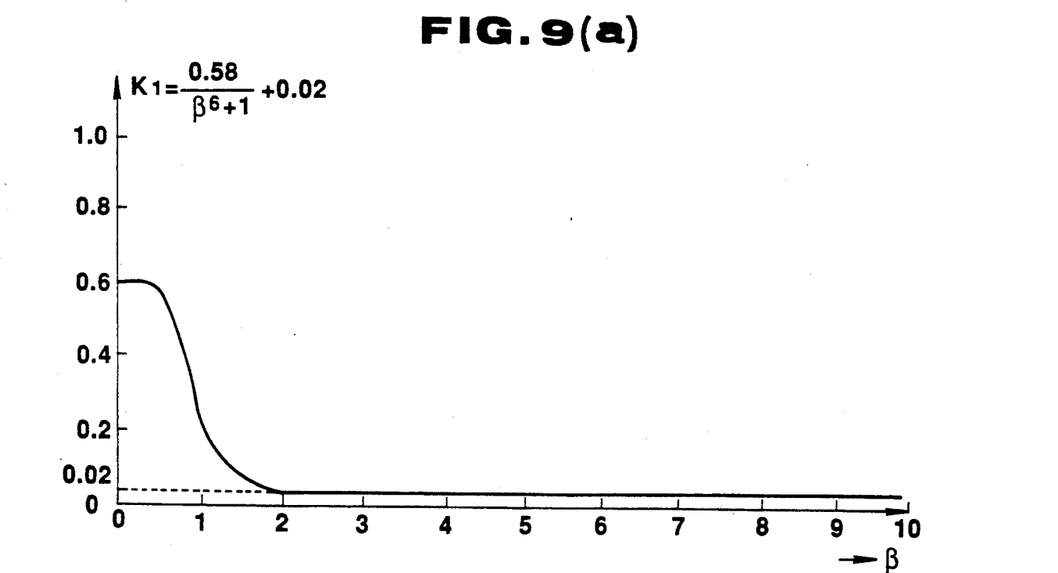
FIG. 9(a) is a graph showing a relationship between a short distance geomagnetic environment index $\beta$ and a coefficient $K_1$ derived by the preferred embodiment of FIG. 3
Figure 9B:
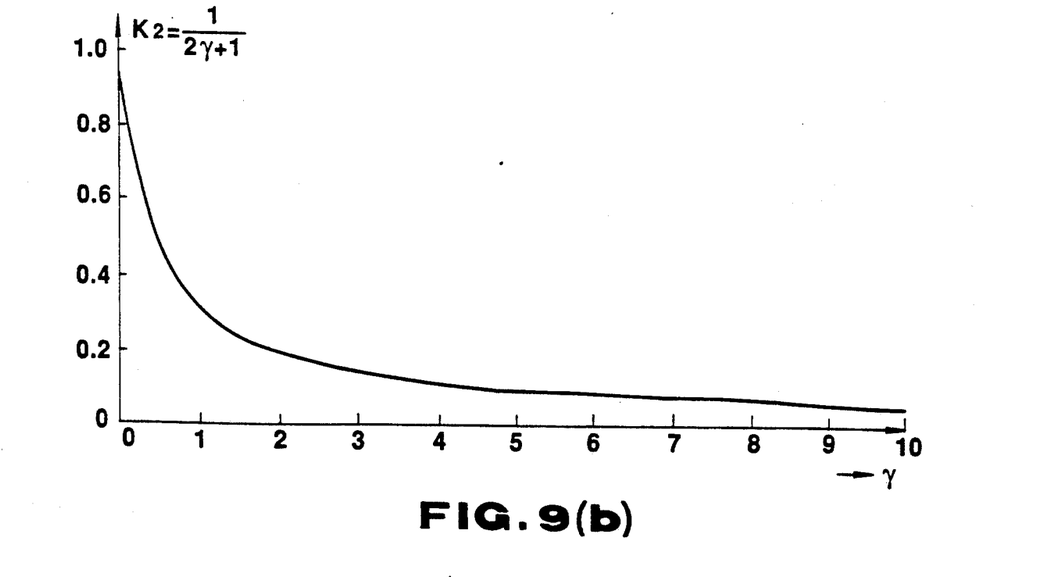
FIG. 9(b) is a graph showing a relationship between a long distance geomagnetic environment index $\gamma$ and a coefficient $K_2$ derived by the preferred embodiment of FIG. 3

FIG. 9(a) is a graph showing a relationship between $K_1$ and the geomagnetic environment index $\beta$ and FIG. (b) is a graph showing a relationship between $K_2$ and the geomagnetic environment index γ. As seen from FIGS. 9(a) and 9(b), $K_1$ and $K_2$ respectively become smaller as the geomagnetic environment indices get larger.

Each of the above-noted constants has the following meaning.

$α_1$: When the disturbance of the geomagnetic field is the least ($β=0$, $γ=0$), the coefficient K gets maximum. The constant $α_1$ is for adjusting this maximum value. As this constant gets larger, the speed of the direction $θ_2$ derived at the step 520 approaching the absolute direction $θ_M$ read out at the step 506 gets higher.

$α_2$: This constant is for adjusting the speed of the direction $θ_2$ derived at the step 520 to approach the absolute direction $θ_M$ read out at the step 506 in case the disturbance of the geomagnetic field is occurring per the order of several meters while the long distance disturbance is the least ($β$ is large, $γ$ is zero). As this constant gets smaller, the approaching speed gets lower. Accordingly, the rate of dependence upon the gyro sensor gets higher.

$α_3$: This constant is for adjusting an influence of the geomagnetic environment index $γ$ upon the approaching speed. Specifically, as this constant gets larger, the influence upon the approaching speed gets larger and the rate of dependence upon the gyro sensor gets larger even when the value $γ$ is small.

$α_4$: This constant is for adjusting the approaching speed as a whole.

n1: This constant is for adjusting the characteristics of $K_1$ to be varied based on the geomagnetic environment index $β$. For example, in FIG. 9(a), because this constant is large (n1=6), $K_1$ varies rapidly around $β=1$. Naturally, when the constant n1 gets larger, the variation of $K_1$ around $β=1$ gets larger, and when the constant n1 gets smaller, the variation of $K_1$ around $β=1$ gets smaller.

n2: This constant is for adjusting the characteristics of $K_2$ to be varied based on the geomagnetic environment index $γ$. For example, in FIG. 9(b), because this constant is small (n2=1), $K_2$ does not vary rapidly in comparison with $K_1$ in FIG. 9(a). Because $α_3=2$, $K_2$ varies rapidly around $γ=\frac{1}{2}$ as this constant gets larger.

As understood from the foregoing explanation, the values of the constants n1 and n2 are determined depending on whether the coefficient K should be varied rapidly or slowly and whether the coefficient K should be varied rapidly around certain values of the geomagnetic environment indices $β$ and $γ$.

Referring back to FIG. 6B, at the steps 528 and 530, the vehicle traveling direction $θ_2$ derived at the step 520 is approached to the absolute direction $θ_M$ read out at the step 506. A rate of the approaching performed at the steps 528 and 530 is determined by the coefficient K. As the coefficient K gets larger, the approaching rate gets larger.

For example, at the step 530, when the coefficient K=1, then $$θ_2=1\times(θ_M-θ_1)+θ_2=θ_M$$

Accordingly, the vehicle traveling direction $θ_2$ derived at the step 520 gets equal to the absolute direction $θ_M$ by one execution of the step 530. On the other hand, when the coefficient K=0, the absolute direction $θ_M$ read out at the step 506 is not reflected at the step 530.

Figure 10:
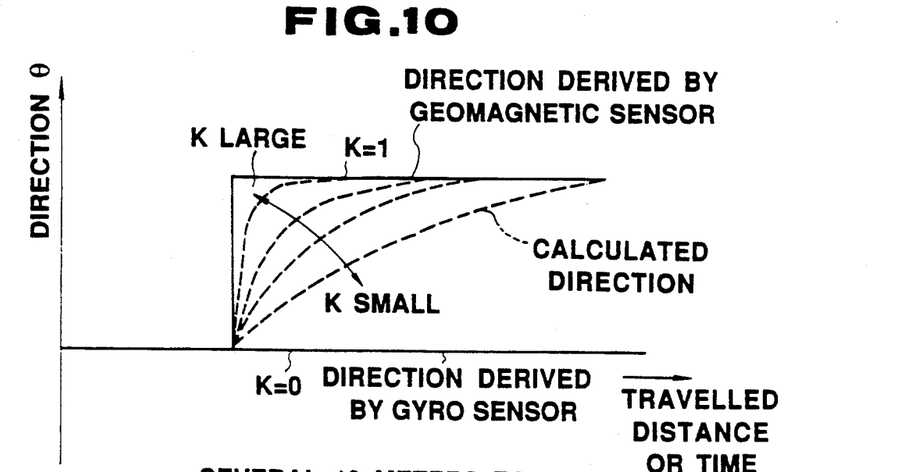
FIG. 10 is a graph of distance or time versus direction showing variations of the traveling direction measurement characteristics according to values of a coefficient K derived by the preferred embodiment of FIG. 3 and FIGS. 11(a)(b)(c) are graphs showing variations of short and long distance geomagnetic environment indicies $\beta$ and $\gamma$ when the disturbance of long distance geomagnetic field occurs.

In FIG. 10, the above-noted characteristics are shown. When the vehicle is running on a straight road with a rapid variation in the geomagnetic field, the vehicle traveling direction $θ_2$ derived at the step 520 approaches the absolute direction $θ_M$ read out at the step 506 faster with a larger value of the coefficient K and less fast with a smaller value of the coefficient K.

Further, when there is no disturbance of the geomagnetic field, then $β=γ=0$, $K_1=0.6$ and $K_2=1.0$. Assuming that the constant $α_4=1$, then K=0.6 (a maximum value). On the other hand, when the disturbance of the geomagnetic field is large and, for example, $β=+\infty$ and $γ=+\infty$, then K=0. If the condition of K=0 lasts long, then the variation in the vehicle traveling direction is derived only by the gyro sensor during that condition so that the drift error is accumulated. However, practically, the coefficient K falls between the minimum value 0 and the maximum value 0.6 so that it is not likely that the condition of K=0 lasts long to allow the accumulation of the drift error. Accordingly, on a long-term basis, the traveling direction $θ_2$ derived at the step 520 approaches the absolute direction $θ_M$ through the step 530 and the drift error is cancelled.

It is to be noted that the step 528 is an instruction for repeating the step 530 as many times as a value of the counter SS. Accordingly, when the value of the counter SS is 2, then the step 530 is repeated twice. On the other hand, when the value of the counter SS is 0, then the process skips the step 530 to a step 532 where the counter SS is reset to 0 for a subsequent execution of the interrupt routine.

The repetition of the step 530 is required for deriving a calculation result on a basis of a predetermined distance since this interrupt routine is executed on a basis of the predetermined time ΔT. Accordingly, in this preferred embodiment, it is equivalent to execute the step 530 per a half rotation of the tire since the counter SS is counted up by 1 in response to the counter S counting up 12 times as shown in FIG. 5. Though it is preferable to execute this interrupt routine per a predetermined distance, it is practical to execute same per a predetermined time while the processed result is equivalent to that on a basis of the predetermined distance, due to a problem of calculation load applied to a central processing unit (CPU) of the microcomputer.

Referring back to FIG. 6B, at a step 534, the absolute direction $θ_M$ read out at the step 506 is stored as $θ_{MOLD}$ for a subsequent execution of the interrupt routine. At a step 536, a vehicle traveling direction derived at the step 530 is stored as $θ$, and then at a step 538, a current position in the form of X and Y coordinate values is renewed. At the step 538, ΔD×SSSS denotes a distance travelled by the vehicle from the prior execution of the interrupt routine. At a step 540, the counter SSSS is reset to 0 for a subsequent execution of the interrupt routine.

It is to be noted that at the initialize step 100 shown in FIG. 4, the vehicle traveling directions $θ$ and $θ_{MOLD}$ are initialized to an absolute direction $θ_M$ which is read out from the geomagnetic sensor at the time of the initialization. Further, the counters S, SS, SSS and SSSS are reset to 0.

Now advantages of using the two geomagnetic environment indices are explained hereinbelow.

Figures 11A, 11B, 11C:
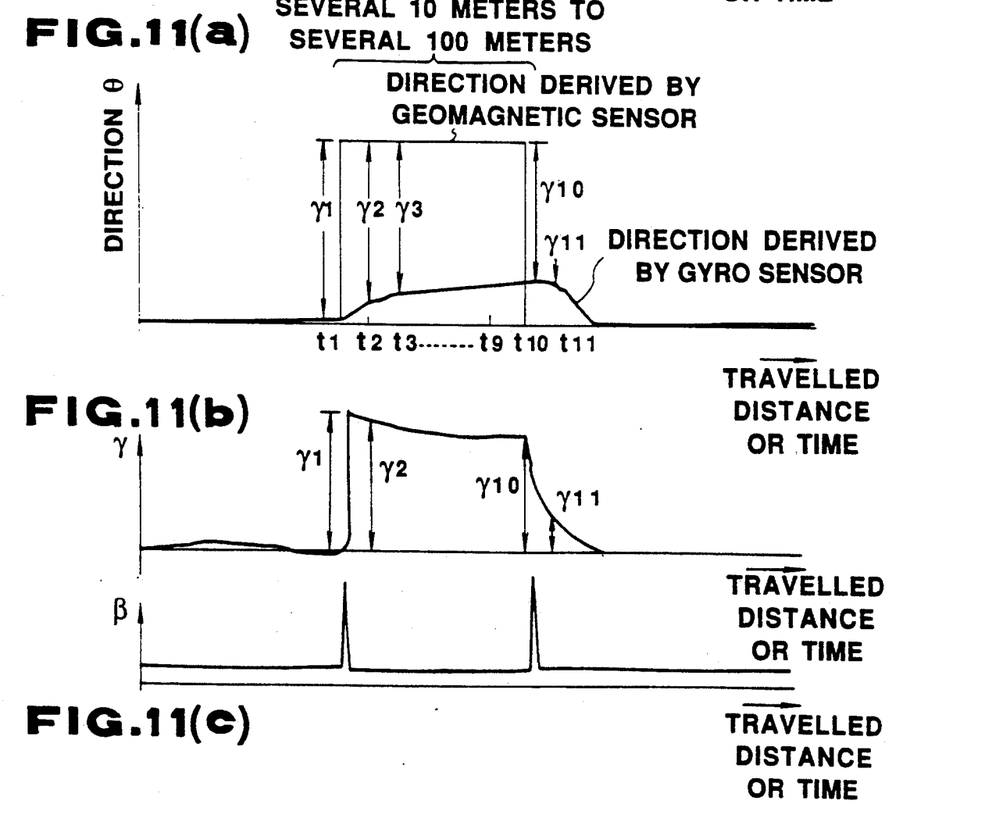

In FIG. 11(a), it is assumed that the abrupt long distance disturbance of the geomagnetic field occurs on a basis of the order of several 10 meters to several 100 meters when the vehicle is traveling on a straight road. For simplification, the short distance disturbance of the geomagnetic field on a basis of the order of several meters is not considered in FIG. 11(a), and thus the geomagnetic environment index $\beta$ is assumed constant.

Because the geomagnetic environment index $\gamma$ is derived by $\gamma = |\theta_2 - \theta_M|$ as shown in FIG. 6A, a difference between the absolute direction $\theta_M$ (corresponding to $\theta_M$ at the step 524 in FIG. 6A) derived by the geomagnetic sensor and the vehicle traveling direction $\theta$ (corresponding to $\theta_2$ at the step 524 in FIG. 6A) derived by the gyro sensor, denotes the index $\gamma$ in FIG. 11(a). A variation in value of the index $\gamma$ is shown in FIG. 11(b), wherein it is seen that the value of index $\gamma$ is held large between time points t1 to t10. Accordingly, $K_2$ becomes small between the time points t1 to t10, and thus the coefficient K also becomes small. Therefore, the approaching rate or speed as described above becomes small.

On the other hand, after the geomagnetic field returns to normal at the time point 10, the index $\gamma$ rapidly gets smaller between time points t10 to t11, and thus the foregoing approaching rate gets larger.

FIG. 11(c) shows a variation in value of the geomagnetic environment index $\beta$. As seen from FIG. 11(c), because the value of the index $\beta$ varies only at the time point t1 and t10 in this example, that is, at the time of occurrences of the variation in the long distance disturbance of the geomagnetic field, the value of the index $\beta$ remains small between the time points t2 to t9. Accordingly, if the index $\gamma$ is not used in the calculation of the coefficient K, the foregoing approaching rate becomes large between the time points t2 to t9 so that the measured direction $\theta$ rapidly approaches the absolute direction $\theta_M$ in FIG. 11(a). Therefore, the finally derived direction is largely deviated from the true traveling direction of the vehicle.

The distance or time axes in FIGS. 11(a), (b) and (c) are all common.

It is to be appreciated that by using the two geomagnetic environment indices $\beta$ and $\gamma$, it is possible to provide an accurate measurement of the vehicle traveling direction even when the short and long distance disturbance of the geomagnetic field occurs.

Further, the exemplified values of the constants $\alpha_1$ to $\alpha_4$, n1 and n2 are set assuming that the used gyro sensor has a drift error of about 0.1 deg/sec. Accordingly, when using the gyro sensor having a drift error of a lesser value, the values of the constants may be changed to increase the rate of dependence upon the gyro sensor so as to provide a more accurate measurement of the vehicle traveling direction with a reduced effect of the disturbance of the geomagnetic field.

It is to be understood that this invention is not to be limited to the embodiments described above, and that various changes and modifications may be made without departing from the spirit and scope of the invention as defined in the appended claims.

What is claimed is:

1. A system for measuring a traveling direction of a vehicle, comprising:
    first means for deriving a first variation representing a change in a traveling direction of the vehicle based on an output from a gyro sensor;
    second means for deriving a first vehicle traveling direction based on said first variation;
    third means for deriving a second vehicle traveling direction based on an output from a geomagnetic sensor, said geomagnetic sensor deriving said output based on a geomagnetic field around the vehicle;
    fourth means for deriving a second variation representing a change in said second vehicle traveling direction;
    fifth means for deriving a first index, said first index indicative of a difference between said first and second variations to represent a disturbance of the geomagnetic field on a short distance basis;
    sixth means for deriving a second index, said second index indicative of a difference between said first and second vehicle traveling directions to represent a disturbance of the geomagnetic field on a long distance basis; and
    seventh means for calculating a third vehicle traveling direction based on said first and second directions, said seventh means changing a rate of dependence upon said first and second directions based on values of said first and second indicies to derive said third vehicle traveling direction.

2. The system as set forth in claim 1, wherein said fifth means sets said first variation to zero when said first variation is less than a predetermined value.

3. The system as set forth in claim 1, wherein said short distance basis is per the order of several meters, and said long distance basis is per the order of several 10 to several 100 meters.

4. The system as set forth in claim 1, wherein said seventh means includes eighth means for deriving a coefficient based on said first and second indices, and said rate of dependence varies according to a value of said coefficient.

5. The system as set forth in claim 4, wherein said seventh means derives said third vehicle traveling direction based on a following equation:

$$\theta = K \times (\theta_M - \theta_1) + \theta_1$$

wherein, $\theta$ is the third vehicle traveling direction, K is the coefficient, $\theta_M$ is the second vehicle traveling direction and $\theta_1$ is the first vehicle traveling direction.

6. The system as set forth in claim 4, wherein said coefficient is derived based on a following equation:

$$K = \left( \frac{0.58}{\beta^6 + 1} + 0.02 \right) \times \frac{1}{2\gamma + 1} \times 0.1$$

wherein, K is the coefficient, $\beta$ is the first index and $\gamma$ is the second index.

7. The system as set forth in claim 1, wherein said calculation by said seventh means is executed per a predetermined time.

8. The system as set forth in claim 7, wherein said seventh means converts a value derived by said calculation to a value on a basis of a predetermined distance travelled by the vehicle.

9. The system as set forth in claim 8, wherein said predetermined time is 100 msec and said predetermined distance corresponds to a half rotation of a vehicle tire.

10. The system as set forth in claim 8, further including ninth means for determining whether the vehicle is stopped, and tenth means for correcting a drift error of the gyro sensor by its output when said ninth means determines that the vehicle is stopped.

11. A system for measuring a traveling direction of a vehicle, comprising:
    first means for deriving a first vehicle traveling direction based on an output from a gyro sensor second means for deriving a second vehicle traveling direction based on an output from a geomagnetic sensor, said geomagnetic sensor deriving said output based on a geomagnetic field around the vehicle third means for deriving a first index, said first index indicative of a disturbance of the geomagnetic field on a short distance basis fourth means for deriving a second index, said second index indicative of a disturbance of the geomagnetic field on a long distance basis fifth means for calculating a third vehicle traveling direction based on said first and second directions, said fifth means changing a rate of dependence upon said first and second directions based on values of said first and second indicies to derive said third vehicle traveling direction.

12. The system as set forth in claim 11, wherein said short distance basis is per the order of several meters, and said long distance basis is per the order of several 10 to several 100 meters.

* * * * *